United States Patent
Newin et al.

(10) Patent No.: US 11,606,403 B2
(45) Date of Patent: Mar. 14, 2023

(54) SYSTEMS AND METHODS FOR ECHO MANAGEMENT IN CONFERENCING OVER A NETWORK USING MIXED MULTICAST

(71) Applicant: Johnson Controls Tyco IP Holdings LLP, Milwaukee, WI (US)

(72) Inventors: Douglas Newin, Pointe Claire (CA); Simon Vermette, Sainte-Julie (CA); Kevin Lévesque-Landry, Montreal (CA)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 834 days.

(21) Appl. No.: 16/390,914

(22) Filed: Apr. 22, 2019

(65) Prior Publication Data
US 2020/0336522 A1   Oct. 22, 2020

(51) Int. Cl.
*H04L 65/611* (2022.01)
*H04L 65/1069* (2022.01)
(Continued)

(52) U.S. Cl.
CPC ........ *H04L 65/611* (2022.05); *G10L 21/0208* (2013.01); *H04L 65/1069* (2013.01); *H04M 7/006* (2013.01); *G10L 2021/02082* (2013.01)

(58) Field of Classification Search
CPC ............. H04L 65/4076; H04L 65/1069; H04L 65/1089; H04L 65/604; H04L 65/403;
(Continued)

(56) References Cited

U.S. PATENT DOCUMENTS 6,075,814 A * 6/2000 Yamano ................. H04M 11/06
                                                        455/574
6,304,596 B1 * 10/2001 Yamano ............. H04Q 11/0435
                                                         375/222
(Continued)

FOREIGN PATENT DOCUMENTS

EP         2597850 A1     5/2013

OTHER PUBLICATIONS

International Search Report and Written Opinion issued in International Patent Application No. PCT/US2020/028247 dated Jul. 7, 2020.

*Primary Examiner* — Lisa Hashem
(74) *Attorney, Agent, or Firm* — ArentFox Schiff LLP

(57) ABSTRACT

A system includes participant nodes that unicast a voice stream to a master node and receive a multicast voice stream from the master node. The multicast voice stream may be a mixed voice stream mixing the voice streams of the participants. In this case, each participant performs echo cancellation on the multicast voice stream. Alternatively, the multicast voice stream may be a multiplexed voice stream multiplexing the voice streams of all participants. In this case, each participant de-multiplexes the multicast voice stream and generates a mixed voice stream that does not include that participant. Alternatively, the multicast voice stream received by each participant may be a multiplexed digital voice stream multiplexing multiple mixed streams including one mixed stream that does not include the voice stream of that participant. In this case, each participant de-multiplexes the multicast voice stream to obtain the mixed stream that does not include that participant.

20 Claims, 10 Drawing Sheets

(51) Int. Cl.
*G10L 21/0208* (2013.01)
*H04M 7/00* (2006.01)

(58) Field of Classification Search
CPC ...... G10L 21/0208; G10L 2021/02082; H04M 7/006; H04M 3/002; H04M 3/568
See application file for complete search history.

(56) References Cited

U.S. PATENT DOCUMENTS

| | | | |
|---|---|---|---|
| 6,327,276 B1 | 12/2001 | Robert et al. | |
| 6,614,781 B1 * | 9/2003 | Elliott | H04L 65/765 370/352 |
| 7,406,119 B2 * | 7/2008 | Yamano | H04L 12/10 375/222 |
| 7,564,840 B2 * | 7/2009 | Elliott | H04L 9/40 370/522 |
| 8,036,214 B2 * | 10/2011 | Elliott | H04L 65/1026 370/522 |
| 8,085,761 B2 * | 12/2011 | Elliott | H04L 65/1043 370/522 |
| 8,837,330 B1 | 9/2014 | Modai et al. | |
| 10,311,866 B2 * | 6/2019 | Kang | G10L 21/0208 |
| 10,958,791 B2 * | 3/2021 | Newin | H04M 3/561 |
| 11,201,968 B2 * | 12/2021 | Newin | H04M 3/002 |
| 2002/0118638 A1 * | 8/2002 | Donahue | H04L 61/5007 370/316 |
| 2003/0053434 A1 | 3/2003 | Chow et al. | |
| 2005/0073575 A1 | 4/2005 | Thacher et al. | |
| 2006/0227963 A1 * | 10/2006 | Bernard | H04M 1/72502 379/406.01 |
| 2008/0037725 A1 | 2/2008 | Berstis et al. | |
| 2008/0151791 A1 * | 6/2008 | LeBlanc | H04M 9/082 370/291 |
| 2008/0200159 A1 * | 8/2008 | Lai | H04M 3/568 455/416 |
| 2011/0305170 A1 * | 12/2011 | Lai | H04L 12/1827 370/352 |
| 2014/0160996 A1 * | 6/2014 | Hellhake | H04L 12/185 370/261 |
| 2016/0014373 A1 | 1/2016 | LaFata et al. | |
| 2017/0263247 A1 * | 9/2017 | Kang | G10L 15/30 |
| 2020/0336522 A1 * | 10/2020 | Newin | H04L 65/403 |

* cited by examiner

SYSTEMS AND METHODS FOR ECHO MANAGEMENT IN CONFERENCING OVER A NETWORK USING MIXED MULTICAST

CROSS-REFERENCE TO RELATED APPLICATIONS

This application is related to concurrently-filed U.S. Non-Provisional application with Ser. No. 16/390,927, entitled "SYSTEMS AND METHODS FOR ECHO MANAGEMENT IN CONFERENCING OVER A NETWORK USING MULTIPLEXED MULTICAST" and filed on Apr. 22, 2019, and concurrently-filed U.S. Non-Provisional application with Ser. No. 16/390,952, entitled "SYSTEMS AND METHODS FOR ECHO MANAGEMENT IN CONFERENCING OVER A NETWORK USING MULTIPLEXED MIXED MULTICAST" and filed on Apr. 22, 2019, which are both expressly incorporated by reference herein in their entirety.

BACKGROUND

The present disclosure relates generally to conferencing, and more particularly, to systems and methods for audio conferencing over a network.

A conference call between multiple parties may be established by using voice over Internet protocol (VoIP) where appropriate hardware and software is utilized to use the Internet as a communication medium for sending and receiving voice data packets for a VOIP conference call.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods that allow for voice over Internet protocol (VoIP) conferencing.

In an aspect, a method of VoIP conferencing at a participant node includes transmitting a digital voice stream to a master node over a unicast session. The method further includes receiving a mixed digital voice stream from the master node over a multicast session, where the mixed digital voice stream includes a plurality of digital voice streams including the digital voice stream of the participant node. The method further includes cancelling the digital voice stream of the participant node from the mixed digital voice stream to obtain an echo-cancelled mixed digital voice stream.

In another aspect, a method of VoIP conferencing at a master node includes receiving a plurality of digital voice streams from a plurality of participant nodes over a plurality of unicast sessions. The method further includes mixing the plurality of digital voice streams and an ingress digital voice stream of the master node to obtain a mixed digital voice stream. The method further includes transmitting the mixed digital voice stream to the plurality of participant nodes over a multicast session.

In a further aspect, a method of VoIP conferencing at a participant node includes transmitting a digital voice stream to a master node over a unicast session. The method further includes receiving a multiplexed digital voice stream from the master node over a multicast session, where the multiplexed digital voice stream includes a plurality of digital voice streams including the digital voice stream of the participant node. The method further includes de-multiplexing the multiplexed digital voice stream to obtain the plurality of digital voice streams. The method further includes generating a mixed digital voice stream that mixes the plurality of digital voice streams except for the digital voice stream of the participant node.

In yet another aspect, a method of VoIP conferencing at a master node includes receiving a plurality of digital voice streams from a plurality of participant nodes over a plurality of unicast sessions. The method further includes multiplexing the plurality of digital voice streams and an ingress digital voice stream of the master node to obtain a multiplexed digital voice stream. The method further includes transmitting the multiplexed digital voice stream to the plurality of participant nodes over a multicast session.

In a further aspect, a method of VoIP conferencing at a participant node includes transmitting a digital voice stream to a master node over a unicast session. The method further includes receiving a multiplexed digital voice stream from the master node over a multicast session, where the multiplexed digital voice stream includes a plurality of mixed digital voice streams, the plurality of mixed digital voice streams including a mixed digital voice stream that includes a plurality of digital voice streams except for the digital voice stream of the participant node. The method further includes de-multiplexing the multiplexed digital voice stream to obtain the mixed digital voice stream.

In another aspect, a method of VoIP conferencing at a master node includes receiving a plurality of digital voice streams from a plurality of participant nodes over a plurality of unicast sessions. The method further includes generating a plurality of mixed digital voice streams that include, for each participant node, a mixed digital voice stream that includes an ingress digital voice stream of the master node and the plurality of digital voice streams except for a digital voice stream received from that participant node. The method further includes multiplexing the plurality of mixed digital voice streams into a multiplexed digital voice stream. The method further includes transmitting the multiplexed digital voice stream to the plurality of participant nodes over a multicast session.

In a further aspect, a participant node for VoIP conferencing includes a transceiver configured to transmit a digital voice stream to a master node over a unicast session. The transceiver is further configured to receive a mixed digital voice stream from the master node over a multicast session, where the mixed digital voice stream includes a plurality of digital voice streams including the digital voice stream of the participant node. The participant node further includes a digital echo canceller configured to cancel the digital voice stream of the participant node from the mixed digital voice stream to obtain an echo-cancelled mixed digital voice stream.

In another aspect, a master node for VoIP conferencing includes a transceiver configured to receive a plurality of digital voice streams from a plurality of participant nodes over a plurality of unicast sessions. The master node further includes a mixer configured to mix the plurality of digital voice streams and an ingress digital voice stream of the master node to obtain a mixed digital voice stream. The transceiver is further configured to transmit the mixed digital voice stream to the plurality of participant nodes over a multicast session.

In a further aspect, a participant node for VoIP conferencing includes a transceiver configured to transmit a digital voice stream to a master node over a unicast session. The transceiver is further configured to receive a multiplexed digital voice stream from the master node over a multicast session, where the multiplexed digital voice stream includes a plurality of digital voice streams including the digital voice stream of the participant node. The participant node further includes a de-multiplexer configured to de-multiplex the multiplexed digital voice stream to obtain the plurality of digital voice streams. The participant node further includes a mixer configured to generate a mixed digital voice stream that includes the plurality of digital voice streams except for the digital voice stream of the participant node.

In another aspect, a master node for VoIP conferencing includes a transceiver configured to receive a plurality of digital voice streams from a plurality of participant nodes over a plurality of unicast sessions. The master node further includes a multiplexer configured to multiplex the plurality of digital voice streams and an ingress digital voice stream of the master node to obtain a multiplexed digital voice stream. The transceiver is further configured to transmit the multiplexed digital voice stream to the plurality of participant nodes over a multicast session.

In a further aspect, a participant node for VoIP conferencing includes a transceiver configured to transmit a digital voice stream to a master node over a unicast session. The transceiver is further configured to receive a multiplexed digital voice stream from the master node over a multicast session, where the multiplexed digital voice stream includes a plurality of mixed digital voice streams, the plurality of mixed digital voice streams including a mixed digital voice stream that includes a plurality of digital voice streams except for the digital voice stream of the participant node. The participant node further includes a de-multiplexer configured to de-multiplex the multiplexed digital voice stream to obtain the mixed digital voice stream.

In another aspect, a master node for VoIP includes a transceiver configured to receive a plurality of digital voice streams from a plurality of participant nodes over a plurality of unicast sessions. The master node further includes a mixer configured to generate a plurality of mixed digital voice streams that include, for each participant node, a mixed digital voice stream that includes an ingress digital voice stream of the master node and the plurality of digital voice streams except for a digital voice stream received from that participant node. The master node further includes a multiplexer configured to multiplex the plurality of mixed digital voice streams into a multiplexed digital voice stream. The transceiver is further configured to transmit the multiplexed digital voice stream to the plurality of participant nodes over a multicast session.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide methods, apparatuses, and systems that allow for voice over Internet protocol (VoIP) conferencing among a master node and a plurality of participant nodes, where each node implements one or more of mixing, multiplexing, or echo cancellation functionality so that each node may obtain a mixed voice stream that does not include the ingress voice stream of that node. In an aspect, for example, each participant node receives, from the master node, a mixed voice stream that mixes the voice streams of all conference participants, and each participant node performs echo cancellation on the mixed voice stream to remove the ingress voice stream of that participant node. In an alternative aspect, for example, each participant node receives, from the master node, a multiplexed voice stream that multiplexes the voice streams of all conference participants, and each participant node de-multiplexes the multiplexed voice stream to obtain the individual voice streams of the conference participants. Then, each participant node mixes the voice streams of all conference participants except for the ingress voice stream of that participant node. Accordingly, the need for implementing echo cancellation functionality at every node is obviated, hence reducing complexity, development time, and central processing unit (CPU) bandwidth requirements. In another alternative aspect, for example, each participant node receives, from the master node, a multiplexed voice stream that multiplexes a plurality of mixed voice streams including one mixed voice stream configured per participant node. The mixed voice stream configured for each participant node mixes the voice streams of all conference participants except for the ingress voice stream of that participant node. Each participant node de-multiplexes the received multiplexed voice stream to obtain the mixed voice stream configured for that participant node. Accordingly, the need for implementing echo cancellation functionality at every node is obviated.

Turning now to the figures, example aspects are depicted with reference to one or more components described herein, where components in dashed lines may be optional.

Mixed Multicast

Figure 1:
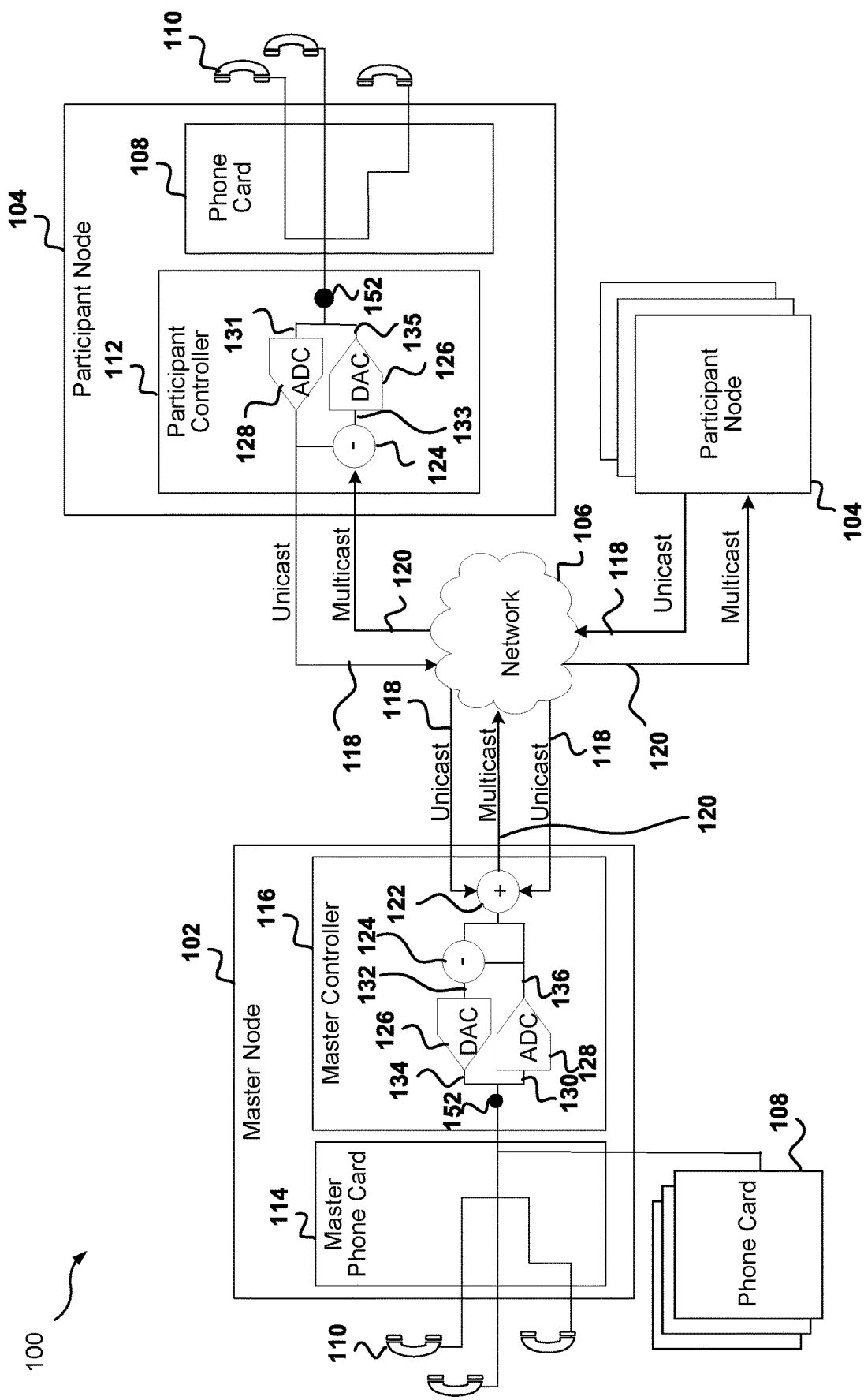
FIG. 1 is a schematic diagram of a first example system for voice over Internet protocol (VoIP) conferencing.

Referring to FIG. 1, in one non-limiting aspect, a first VoIP conferencing system 100 includes a master node 102 that manages a VoIP conference call among a plurality of conference participants, where the conference participants includes the master node 102 and a plurality of participant nodes 104. In one non-limiting aspect, for example, the master node 102 may be statically configured with a programming tool, and the corresponding configuration may be downloaded to the master node 102 during system setup.

The master node 102 includes a master phone card 114 that aggregates the analog voice streams of a number of handsets 110, e.g., by generating a weighted sum of the analog voice streams. The master phone card 114 may optionally also aggregate the analog voice streams of one or more local phone cards 108, e.g., by generating a weighted sum of the analog voice streams. The first VoIP conferencing system 100 further includes a plurality of participant nodes 104 that each include a phone card 108 that aggregates a number of handsets 110. The first VoIP conferencing system 100 includes a network 106 over which the master node 102 and the participant nodes 104 participate in a mixed multicast VoIP conference call managed by the master node 102. Specifically, in an aspect, the master node 102 receives a participant digital voice stream 118 from each participant node 104 over a unicast session. The master node 102 generates a mixed digital voice stream 120 by mixing the received participant digital voice streams 118 and an ingress master digital voice stream 136 of the master node 102. The master node 102 then transmits the mixed digital voice stream 120 to the participant nodes 104 over a multicast session.

In an aspect, the network 106 may be, for example, an Internet protocol (IP) network configured for communicating IP packets. In one non-limiting aspect, for example, the unicast session established between each participant node 104 and the master node 102 may be a unicast real-time transport (RTP) session, and the multicast session established between the master node 102 and the participant nodes may be a multicast RTP session. For example, in an aspect each participant node 104 may establish a unicast RTP session with the master node 102 in the application layer of the user datagram protocol (UDP)/Internet protocol (IP), so that the voice stream of each participant node 104 may be back-hauled/transported to the master node 102 over the unicast RTP session of that participant node 104. Further, the master node 102 may establish a multicast RTP session with the participant nodes 104 in the application layer of the UDP/IP stack, so that the mixed digital voice stream 120 may be transmitted from the master node 102 to the participant nodes 104 over the multicast RTP session of the master node 102.

In an aspect, the master node 102 and each of the participant nodes 104 may apply digital echo cancellation to the mixed digital voice stream 120. Specifically, for example, in an aspect, the master node 102 may include a master controller 116 that implements a mixer 122, a digital echo canceller 124, a digital-to-analog converter (DAC) 126, and an analog-to-digital converter (ADC) 128. In an aspect, the ADC 128 in the master controller 116 digitizes an ingress master analog voice stream 130 provided by the master phone card 114 and outputs an ingress master digital voice stream 136. The mixer 122 in the master controller 116 mixes the ingress master digital voice stream 136 with the participant digital voice streams 118 received from the participant nodes 104 to generate the mixed digital voice stream 120. The master node 102 then transmits the mixed digital voice stream 120 to the participant nodes 104 over a multicast session. Additionally, the digital echo canceller 124 in the master controller 116 receives the mixed digital voice stream 120 and performs digital echo cancellation on the mixed digital voice stream 120 by subtracting the ingress master digital voice stream 136 of the master node 102 from the mixed digital voice stream 120 to generate a master echo-cancelled mixed digital voice stream 132. The DAC 126 in the master controller 116 then converts the master echo-cancelled mixed digital voice stream 132 into a master echo-cancelled mixed analog voice stream 134 which is sent to the master phone card 114 to be outputted by the handsets 110 connected to the master phone card 114.

In one non-limiting aspect, for example, the mixer 122 may be configured to perform a weighted addition on the signals input to the mixer 122. In an aspect, for example, the weights in the weighted addition may be configured to avoid saturation/distortion and/or to equalize the signals input to the mixer 122.

In an aspect, each participant node 104 also includes a digital echo canceller 124, a DAC 126, and an ADC 128 that provide similar functionality as in the master node 102. Specifically, in an aspect, a participant controller 112 at each participant node 104 receives a participant analog voice stream 131 from the phone card 108 in that participant node 104. Then, the ADC 128 in the participant controller 112 converts the participant analog voice stream 131 received from the phone card 108 into a participant digital voice stream 118. The participant node 104 then transmits the participant digital voice stream 118 to the master node 102 over a unicast session. Further, a digital echo canceller 124 in the participant controller 112 cancels the participant digital voice stream 118 of the participant node 104 from the mixed digital voice stream 120 received from the master node 102 to obtain a participant echo-cancelled mixed digital voice stream 133. Accordingly, the digital echo canceller 124 filters out the ingress participant digital voice stream 118 of that participant node 104 from the mixed digital voice stream 120 received from the master node 102. Then, the DAC 126 in the participant controller 112 converts the participant echo-cancelled mixed digital voice stream 133 into a participant echo-cancelled mixed analog voice stream 135 which is then sent to the phone card 108 in the participant node 104 to be outputted by the handsets 110 connected to the phone card 108 in the participant node 104.

In an aspect, in the first VoIP conferencing system 100, only the master node 102 needs to include a mixer 122. As such, the CPU bandwidth requirement on the participant nodes 104 is lower than the master node 102.

Optionally, in an aspect, the master controller 116 and/or the participant controller 112 may also include an analog hybrid filtering circuit 152 to implement analog echo cancellation functionality. Specifically, for example, the master phone card 114 of the master node 102 may aggregate a number of handsets 110 by analog mixing of the signals of the handsets 110 and/or the signals of one or more subtended phone cards 108 that may be daisy-chained with the master phone card 114 to allow for a wider phone coverage. Accordingly, the analog audio signal from a number of handsets 110 and/or a number of daisy-chained phone cards 108 is aggregated before being digitized by the ADC 128 in the master controller 116. Further, the analog hybrid filtering circuit 152 in the master controller 116 may remove the analog ingress signal output by the DAC 126 in the master controller 116 from the aggregated analog signal of the master phone card 114. Similarly, for example, the phone card 108 of a participant node 104 may aggregate a number of handsets 110 by analog mixing of the signals of the handsets 110 and/or the signals of one or more subtended phone cards that may be daisy-chained with the phone card 108 of the participant node 104 to allow for a wider phone coverage. Accordingly, the analog audio signal from a number of handsets 110 and/or a number of daisy-chained phone cards is aggregated before being digitized by the ADC 128 in the participant controller 112. Further, the analog hybrid filtering circuit 152 in the participant controller 112 may remove the analog ingress signal output by the DAC 126 in the participant controller 112 from the aggregated analog signal of the phone card 108 of the participant node 104.

Further, optionally, in some non-limiting aspects, the impedance characteristics of the phone lines may further require software line echo cancellation functionality to be implemented. However, in some other non-limiting aspects with fixed-impedance lines, software line echo cancellation functionality may not be necessary.

In an aspect, optionally, the first VoIP conferencing system 100 may be used, for example, to replace a conventional firefighter phone communication system in which analog phone circuits are bridged with an analog party line and voice signals are added in hardware. For example, in an aspect, existing copper wire analog audio fire panel interconnections may be replaced with digital voice streams communicated over an IP network. In an aspect, for example, a firefighter phone communication system may need to support a minimum channel count, e.g., "n+1" channels where "n" is the number of remote participant nodes 104, e.g., up to 6 participant nodes 104. For example, in an aspect, the master node 102 may support up to 6 firefighter phone circuits to be bridged with an analog party line, where voice signals are added to the analog party line in hardware and then converted to the digital domain as conferenced VoIP audio. In an aspect, as full duplex conversation may be a requirement in a firefighter communication system, echo cancellation functionality may need to be implemented at each participant node 104 to filter out the ingress digital voice stream of that participant node 104. In some aspects, such echo cancellation functionality may add complexity and may require CPU bandwidth. However, the following further aspects may obviate the need for implementing echo cancellation functionality at each participant node 104.

Multiplexed Multicast

Figure 2:
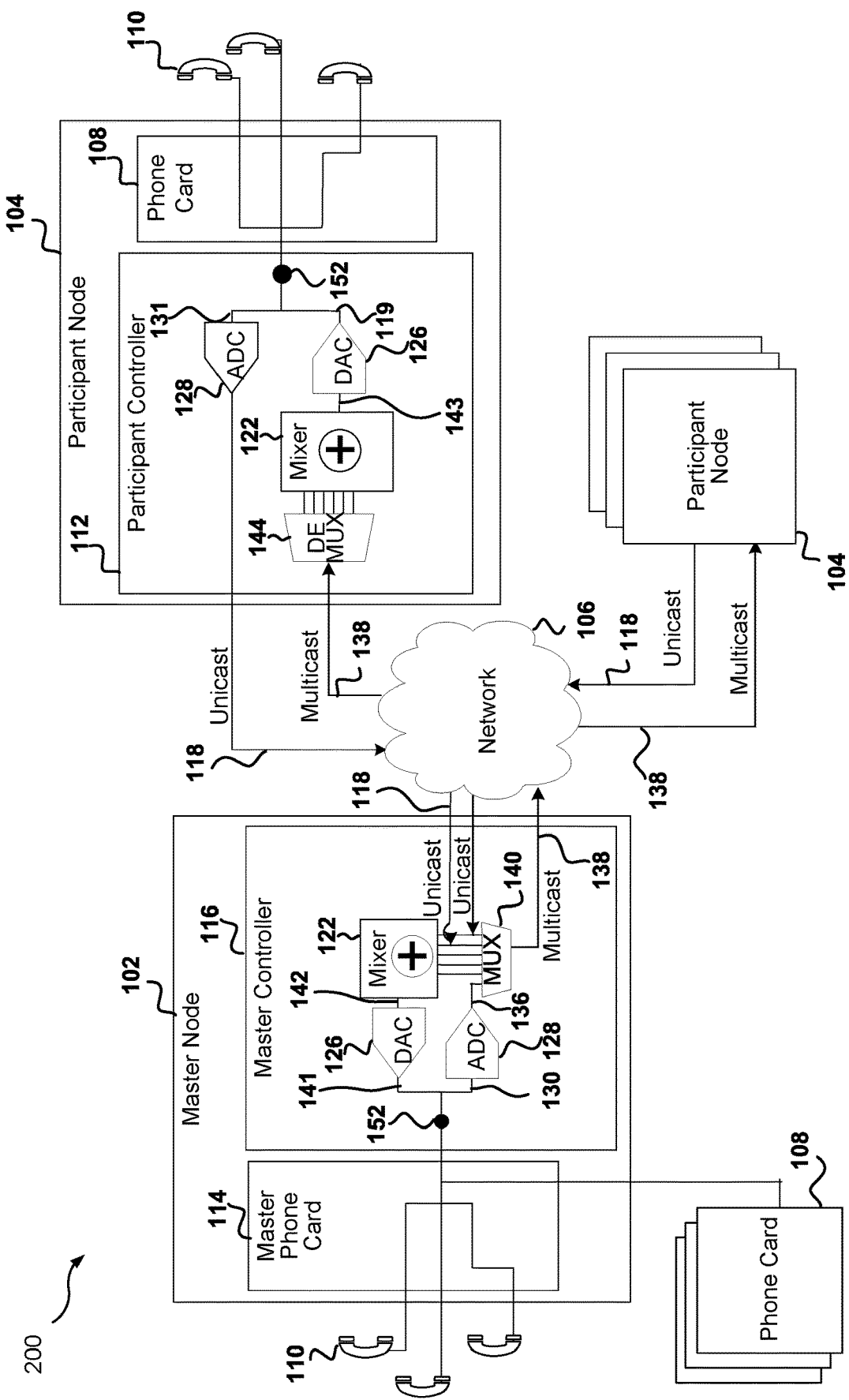
FIG. 2 is a schematic diagram of a second example system for VoIP conferencing.

Referring to FIG. 2, alternatively, in a second VoIP conferencing system 200, the master node 102 may receive the participant digital voice streams 118 from the participant nodes 104 over unicast sessions, generate a multiplexed digital voice stream 138 that multiplexes the voice streams of all of the conference participants, i.e., the master node 102 and the participant nodes 104, and then multicast the multiplexed digital voice stream 138 over the network 106.

More specifically, in an aspect, for example, the participant controller 112 at each participant node 104 receives the participant analog voice stream 131 from the phone card 108 in that participant node 104. Then, the ADC 128 in the participant controller 112 converts the participant analog voice stream 131 received from the phone card 108 into the participant digital voice stream 118. The participant node 104 then transmits the participant digital voice stream 118 to the master node 102 over a unicast session.

Further, in an aspect, the ADC 128 in the master controller 116 digitizes the ingress master analog voice stream 130 provided by the master phone card 114 and outputs the ingress master digital voice stream 136 which is then input to a multiplexer 140 in the master controller 116. Further, the multiplexer 140 generates the multiplexed digital voice stream 138 by multiplexing all of the received participant digital voice streams 118 as well as the ingress master digital voice stream 136 outputted by the ADC 128 in the master controller 116. In an aspect, for example, the multiplexed digital voice stream 138 may include 7 multiplexed channels, one per each conference participant, i.e., one channel for the master node 102 and 6 channels for the participant nodes 104.

Further, in the second VoIP conferencing system 200, the mixer 122 in the master controller 116 generates a master mixed digital voice stream 142 by mixing only the received participant digital voice streams 118, i.e., the mixer 122 does not include the ingress master digital voice stream 136 of the master node 102 in the master mixed digital voice stream 142. Accordingly, the need for echo cancellation functionality at the master node 102 is obviated, i.e., the master controller 116 does not need to implement an echo canceller. Subsequently, the DAC 126 at the master controller 116 converts the master mixed digital voice stream 142 into the master mixed analog voice stream 141 which is provided to the master phone card 114 to be outputted by the handsets 110 connected to the master phone card 114.

Additionally, in the second VoIP conferencing system 200, the participant controller 112 in each participant node 104 includes a de-multiplexer 144 that de-multiplexes the multiplexed digital voice stream 138 received from the master node 102 into individual voice streams of conference participants, i.e., the master node 102 and the participant nodes 104. Then, the mixer 122 at each participant node 104 generates a participant mixed digital voice stream 143 by mixing all the individual voice streams outputted by the de-multiplexer 144 except for the ingress participant digital voice streams 118 of that participant node 104. Subsequently, the DAC 126 at the participant node 104 converts the participant mixed digital voice stream 143 into the participant mixed analog voice stream 119 which is provided to the phone card 108 at the participant node 104 to be outputted by the handsets 110 connected to the phone card 108 of the participant node 104.

Accordingly, the need for echo cancellation functionality at the participant node 104 is also obviated, which is in particular advantageous in jittery conditions. As compared to the first VoIP conferencing system 100 in FIG. 1, the second VoIP conferencing system 200 in FIG. 2 allows for reduced complexity and CPU bandwidth requirements at each participant node 104, but requires a mixer 122, e.g., a "6×1" mixer, at each participant node 104. However, the processing demands of such a mixer 122 may still be less than that of an echo canceller.

In one non-limiting aspect, for example, the multicast session from the master node 102 to the participant nodes 104 may carry a stream of pulse code modulation (PCM) data packets (generated, for example, by the communications component 406 described below with reference to FIG. 4) in which each packet includes 20 msec of audio data. For example, in an aspect, if "n" nodes are being conferenced, the multiplexer 140 may configure "n" pieces of 20 msec traffic in each RTP packet. Accordingly, the multiplexer 140 may multiplex the packets in time by serializing and concatenating the traffic of the conference participants.

Optionally, in an aspect, the master controller 116 and/or the participant controller 112 may also include an analog hybrid filtering circuit 152 to implement analog echo cancellation functionality.

Multiplexed Mixed Multicast

Figure 3:
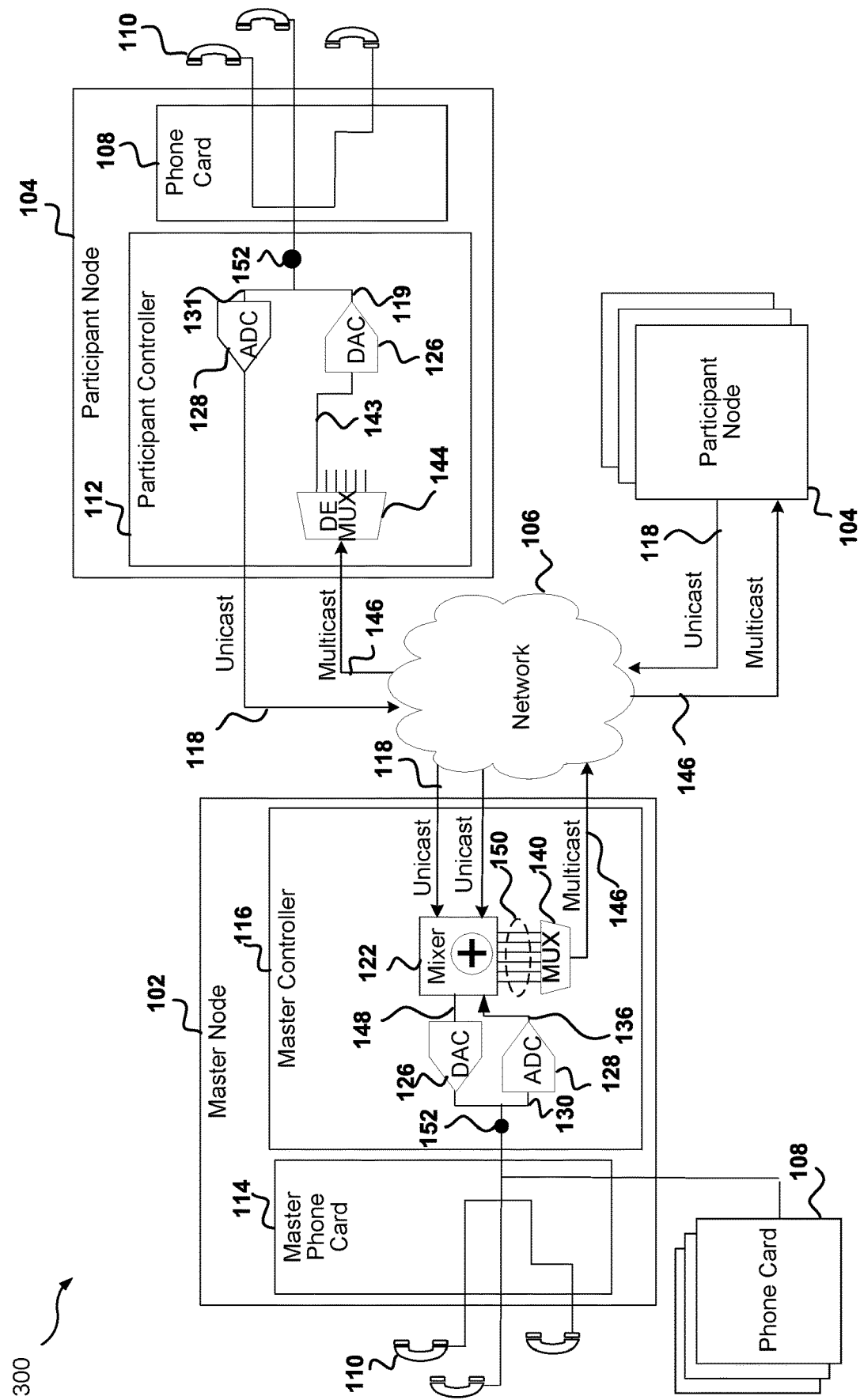
FIG. 3 is a schematic diagram of a third example system for VoIP conferencing.

Referring to FIG. 3, alternatively, in a third VoIP conferencing system 300, the master node 102 may receive the participant digital voice streams 118 from the participant nodes 104, and may generate a mixed voice stream for each participant node 104 by mixing the voice streams of all conference participants except for that participant node 104. The master node 102 may then multiplex the generated mixed voice streams into a single multicast session, e.g., an RTP session carrying a multiplexed mixed digital voice stream 146, and then transmit the multiplexed mixed digital voice stream 146 to the participant nodes 104 over the network 106.

More specifically, in an aspect, for example, a participant controller 112 at each participant node 104 receives a participant analog voice stream 131 from the phone card 108 in that participant node 104. Then, the ADC 128 in the participant controller 112 converts the participant analog voice stream 131 received from the phone card 108 into a participant digital voice stream 118. The participant node 104 then transmits the participant digital voice stream 118 to the master node 102 over a unicast session.

Further, in an aspect, the ADC 128 in the master controller 116 digitizes the ingress master analog voice stream 130 provided by the master phone card 114 and outputs the ingress master digital voice stream 136 that in then input to a mixer 122 in the master controller 116. Further, the mixer 122 generates a plurality of mixed voice streams 150, where the plurality of mixed voice streams 150 includes one mixed voice stream configured for each participant node 104, and the mixed voice stream configured for each participant node 104 mixes the voice streams of all conference participants except for that participant node 104. Since the master node 102 is also a conference participant, the mixer 122 also outputs a master node mixed voice stream 148 that includes all the participant digital voice streams 118 received from participant nodes 104. As such, the master node mixed voice stream 148 does not include the ingress master digital voice stream 136 of the master node 102. Therefore, the master node 102 does not need to perform echo cancellation on the master node mixed voice stream 148, and the master node mixed voice stream 148 may be input to the DAC 126.

The master controller 116 also includes a multiplexer 140 that generates a multiplexed mixed digital voice stream 146 by multiplexing the plurality of mixed voice streams 150 configured by the mixer 122 for the participant nodes 104. The master node 102 then multicasts the multiplexed mixed digital voice stream 146 to the participant nodes 104 over the network 106.

Further, in the third VoIP conferencing system 300, each participant node 104 includes a de-multiplexer 144 that de-multiplexes the multiplexed mixed digital voice stream 146 received from the master node 102 to obtain the participant mixed digital voice stream 143 configured for that participant node 104. Since the participant mixed digital voice stream 143 configured for each participant node 104 does not include the ingress participant digital voice stream 118 of that participant node 104, each participant node 104 may use the participant mixed digital voice stream 143 that is configured for that participant node 104 without performing echo cancellation thereon. Additionally, the participant nodes 104 do not need to implement a mixer since the participant mixed digital voice stream 143 configured for each participant node 104 already includes the voice streams of all other conference participants. Therefore, in the third VoIP conferencing system 300, a mixer 122 is only needed at the master node 102 but not at any of the participant nodes 104, thus allowing for smaller and/or cheaper CPUs to be implemented at the participant nodes 104.

Optionally, in an aspect, the master controller 116 and/or the participant controller 112 may also include an analog hybrid filtering circuit 152 to implement analog echo cancellation functionality.

As compared to the first VoIP conferencing system 100 in FIG. 1 and the second VoIP conferencing system 200 in FIG. 2, the third VoIP conferencing system 300 in FIG. 3 further reduces the complexity and CPU bandwidth requirements at each participant node 104, but requires a more complex mixer 122 at the master node 102. For example, in an aspect, in order to support 6 conference participants, a 6×6 mixer is required at the master node 102. However, the increased complexity/cost of the master node 102 may be offset by the reduced performance requirements at each participant node 104. In an aspect, for example, in order to support 6 conference participants, a 6×6 mixer may be implemented at the master node 102, and a multicast RTP stream may be used for transmitting the multiplexed mixed digital voice stream 146.

Figure 4:
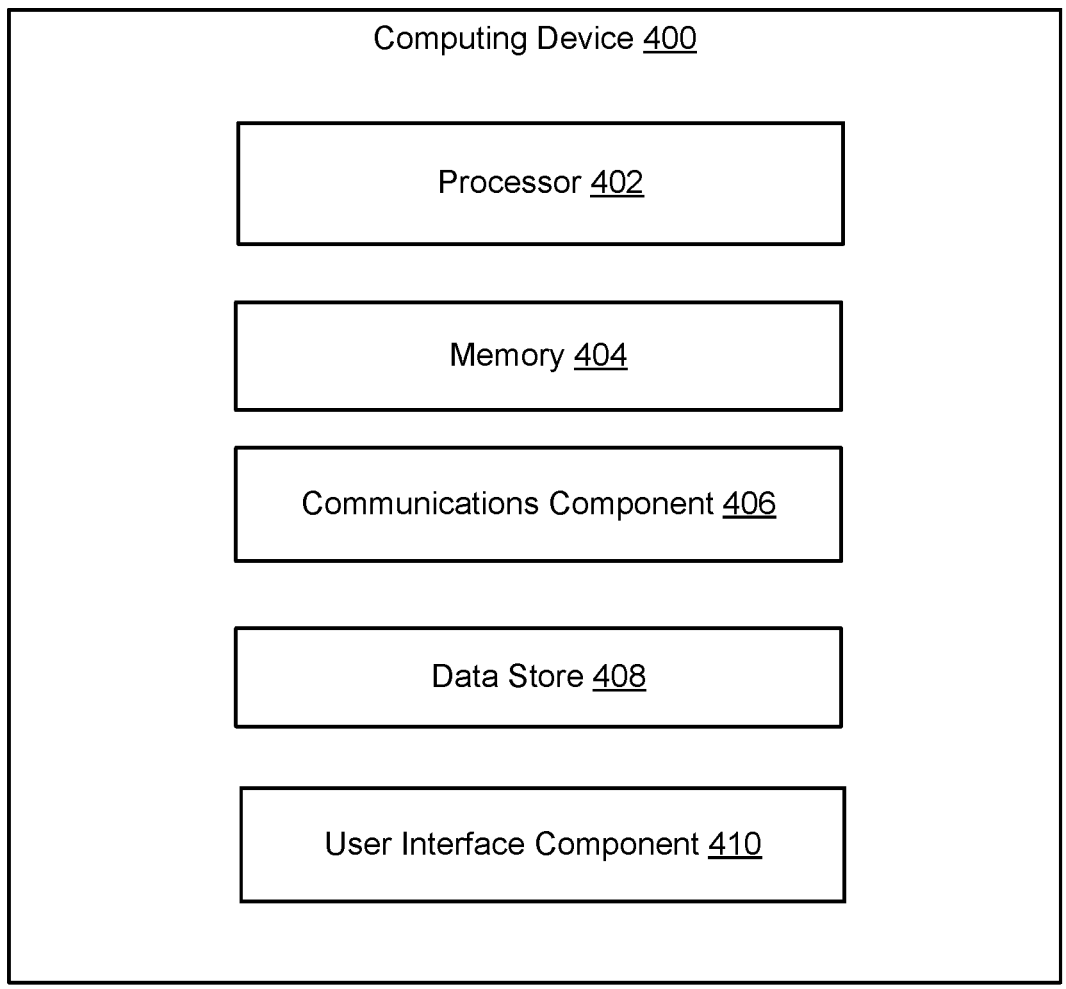
FIG. 4 is a block diagram of an example computing device which may implement a component or the functionality of a component in the example VoIP conferencing systems of FIGS. 1-3.

Referring to FIG. 4, a computing device 400 may implement all or a portion of the functionality described in FIGS. 1-3 above or described in FIGS. 5-10 below. For example, the computing device 400 may be or may include or may be configured to implement the functionality of at least a portion of the master node 102, the participant nodes 104, the master controller 116, the participant controller 112, or any other component described herein with reference to FIGS. 1-3 above. The computing device 400 includes a processor 402 which may be configured to execute or implement software, hardware, and/or firmware modules that perform any functionality described herein with reference to FIGS. 1-3 above or with reference to FIGS. 5-10 below. For example, the processor 402 may be configured to execute or implement software, hardware, and/or firmware modules that perform any functionality described herein with reference to the first VoIP conferencing system 100, the second VoIP conferencing system 200, the third VoIP conferencing system 300, the master node 102, the participant nodes 104, the master controller 116, the participant controller 112, or any other component/system/device described herein with reference to FIGS. 1-3 above.

The processor 402 may be a micro-controller, an application-specific integrated circuit (ASIC), a digital signal processor (DSP), or a field-programmable gate array (FPGA), and/or may include a single or multiple set of processors or multi-core processors. Moreover, the processor 402 may be implemented as an integrated processing system and/or a distributed processing system. The computing device 400 may further include a memory 404, such as for storing local versions of applications being executed by the processor 402, related instructions, parameters, etc. The memory 404 may include a type of memory usable by a computer, such as random access memory (RAM), read only memory (ROM), tapes, magnetic discs, optical discs, volatile memory, non-volatile memory, and any combination thereof. Additionally, the processor 402 and the memory 404 may include and execute an operating system executing on the processor 402, one or more applications, display drivers, etc., and/or other components of the computing device 400.

Further, the computing device 400 may include a communications component 406 that provides for establishing and maintaining communications with one or more other devices, parties, entities, etc. utilizing hardware, software, and services. The communications component 406 may carry communications between components on the computing device 400, as well as between the computing device 400 and external devices, such as devices located across a communications network and/or devices serially or locally connected to the computing device 400. In an aspect, for example, the communications component 406 may include one or more buses, and may further include transmit chain components and receive chain components associated with a wireless or wired transmitter and receiver, respectively, operable for interfacing with external devices.

Additionally, the computing device 400 may include a data store 408, which can be any suitable combination of hardware and/or software, that provides for mass storage of information, databases, and programs. For example, the data store 408 may be or may include a data repository for applications and/or related parameters not currently being executed by processor 402. In addition, the data store 408 may be a data repository for an operating system, application, display driver, etc., executing on the processor 402, and/or one or more other components of the computing device 400.

The computing device 400 may also include a user interface component 410 operable to receive inputs from a user of the computing device 400 and further operable to generate outputs for presentation to the user (e.g., via a display interface to a display device). The user interface component 410 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 410 may include one or more output devices, including but not limited to a display interface, a speaker, a haptic feedback mechanism, a printer, any other mechanism capable of presenting an output to a user, or any combination thereof.

FIGS. 5-10 are flowcharts of method 500, 600, 700, 800, 900, and 1000 of operation of the computing device 400. Each one of the methods 500, 600, 700, 800, 900, and 1000 may implement the functionality described herein with reference to FIGS. 1-4 above, and may be performed by one or more components of the computing device 400 or any device/component described herein with reference to FIGS. 1-4 above. In particular, for example, the method 500 may implement the functionality of the participant nodes 104 in the first VoIP conferencing system 100 in FIG. 1 above. Further, for example, the method 600 may implement the functionality of the master node 102 in the first VoIP conferencing system 100 in FIG. 1 above. Further, for example, the method 700 may implement the functionality of the participant nodes 104 in the second VoIP conferencing system 200 in FIG. 2 above. Further, for example, the method 800 may implement the functionality of the master node 102 in the second VoIP conferencing system 200 in FIG. 2 above. Further, for example, the method 900 may implement the functionality of the participant nodes 104 in the third VoIP conferencing system 300 in FIG. 3 above. Further, for example, the method 1000 may implement the functionality of the master node 102 in the third VoIP conferencing system 300 in FIG. 3 above.

Figure 5:
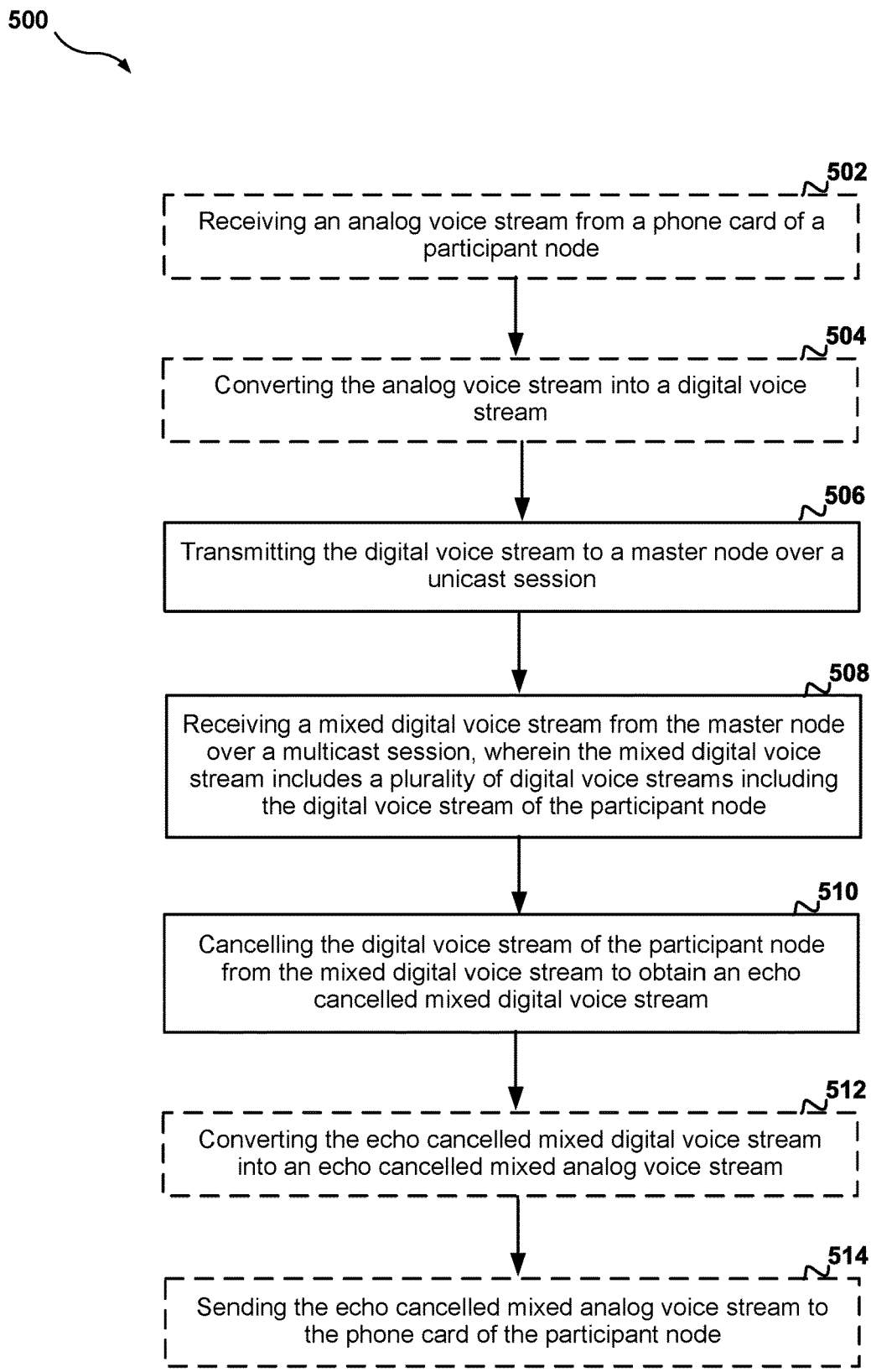
FIG. 5 is a flow diagram of a first example method of VoIP conferencing implemented at a participant node.

Referring first to FIG. 5, at 502 a method 500 of VoIP conferencing at a participant node may include receiving an analog voice stream from a phone card of the participant node. For example, in an aspect, optionally, the participant controller 112 at a participant node 104 may receive, e.g., via a transceiver, a participant analog voice stream 131 from the phone card 108 of the participant node 104. Optionally, in an aspect, for example, the phone card 108 may aggregate one or more handsets 110 or one or more subtended phone cards. Optionally, in an aspect, for example, the participant controller 112 may include an analog hybrid filtering circuit 152 that performs analog echo cancellation on the participant analog voice stream 131.

At 504 the method 500 may include converting the analog voice stream into a digital voice stream. For example, in an aspect, optionally, the ADC 128 in the participant controller 112 of the participant node 104 may convert the participant analog voice stream 131 received from the phone card 108 into a participant digital voice stream 118.

At 506 the method 500 includes transmitting the digital voice stream to a master node over a unicast session. For example, in an aspect, the participant node 104 may transmit, e.g., via a transceiver, the participant digital voice stream 118 to the master node 102 over a unicast session, for example, via the IP network 106.

At 508 the method 500 includes receiving a mixed digital voice stream from the master node over a multicast session, where the mixed digital voice stream includes a plurality of digital voice streams including the digital voice stream of the participant node. For example, in an aspect, the participant node 104 may receive, e.g., via a transceiver, the mixed digital voice stream 120 from the master node 102 over a multicast session, where the mixed digital voice stream 120 includes a plurality of digital voice streams that include the participant digital voice stream 118 of the participant node 104. In an aspect, for example, the mixed digital voice stream 120 mixes the voice streams of all conference participants in the first VoIP conferencing system 100.

At 510 the method 500 includes cancelling the digital voice stream of the participant node from the mixed digital voice stream to obtain an echo-cancelled mixed digital voice stream. For example, in an aspect, a digital echo canceller 124 in the participant controller 112 may cancel the participant digital voice stream 118 of the participant node 104 from the mixed digital voice stream 120 to obtain a participant echo-cancelled mixed digital voice stream 133.

At 512 the method 500 may include converting the echo-cancelled mixed digital voice stream into an echo-cancelled mixed analog voice stream. For example, in an aspect, optionally, the DAC 126 in the participant controller 112 of the participant node 104 may convert the participant echo-cancelled mixed digital voice stream 133 into the participant echo-cancelled mixed analog voice stream 135.

At 514 the method 500 may include sending the echo-cancelled mixed analog voice stream to the phone card of the participant node. For example, in an aspect, optionally, the participant controller 112 of the participant node 104 may send, e.g., via a transceiver, the participant echo-cancelled mixed analog voice stream 135 to the phone card 108 of the participant node 104, so that the participant echo-cancelled mixed analog voice stream 135 may be outputted by the handsets 110 connected to the phone card 108 of the participant node 104.

Figure 6:
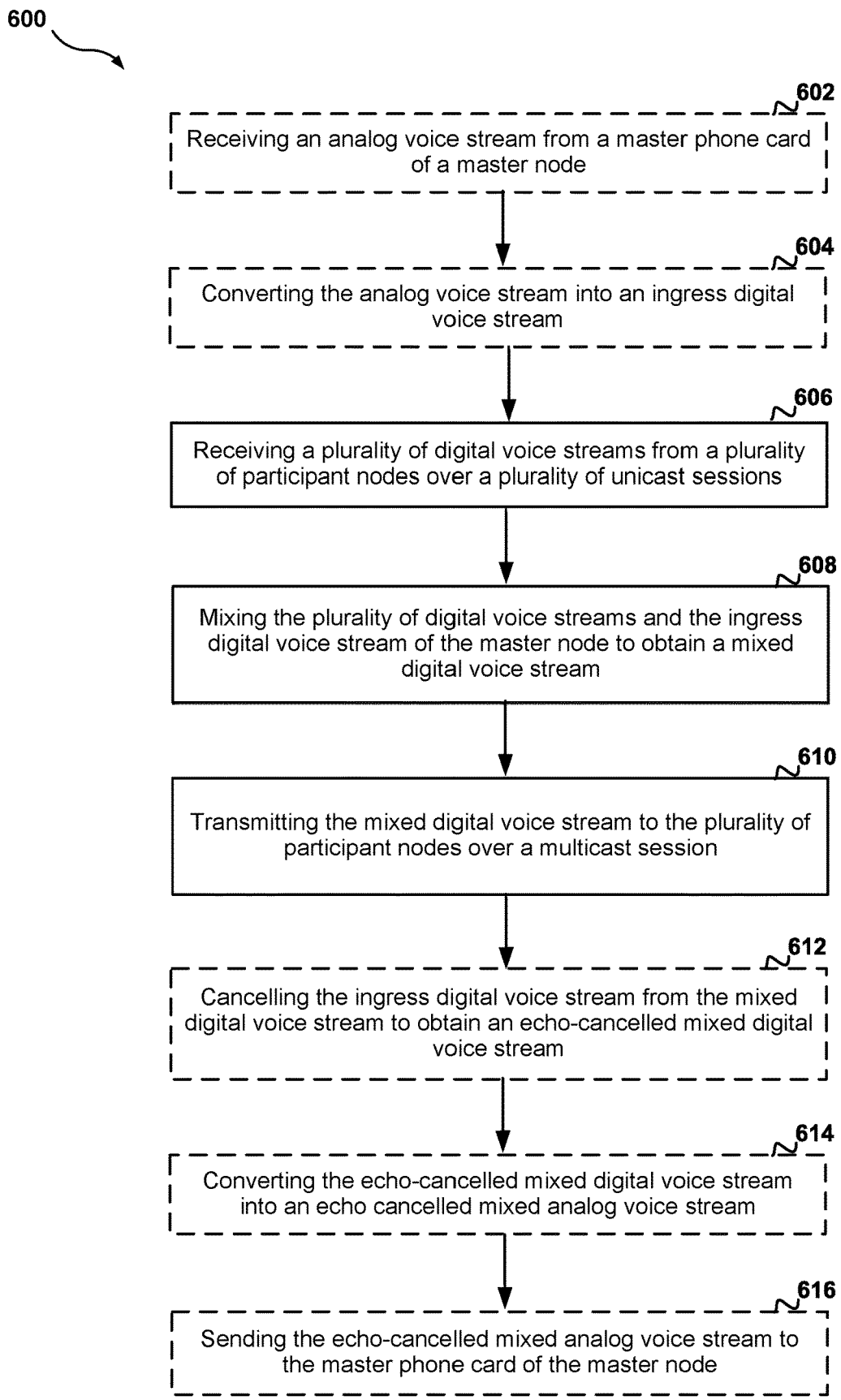
FIG. 6 is a flow diagram of a first example method of VoIP conferencing implemented at a master node.

Referring next to FIG. 6, at 602 a method 600 of VoIP conferencing at a master node may include receiving an analog voice stream from a master phone card of a master node. For example, in an aspect, optionally, the master controller 116 at the master node 102 may receive, e.g., via a transceiver, the ingress master analog voice stream 130 from the master phone card 114 of the master node 102. Optionally, in an aspect, for example, the master phone card 114 may aggregate one or more handsets 110 or one or more subtended phone cards. Optionally, in an aspect, for example, the master controller 116 may include an analog hybrid filtering circuit 152 that performs analog echo cancellation on the ingress master analog voice stream 130.

At 604 the method 600 may further include converting the analog voice stream into the ingress digital voice stream. For example, in an aspect, optionally, the ADC 128 at the master controller 116 may convert the ingress master analog voice stream 130 into the ingress master digital voice stream 136.

At 606 the method 600 further includes receiving a plurality of digital voice streams from a plurality of participant nodes over a plurality of unicast sessions. For example, in an aspect, the master node 102 may receive, e.g., via a transceiver, the participant digital voice streams 118 from each of the participant nodes 104 over respective unicast sessions.

At 608 the method 600 further includes mixing the plurality of digital voice streams and an ingress digital voice stream of the master node to obtain a mixed digital voice stream. For example, in an aspect, the mixer 122 at the master controller 116 may mix the participant digital voice streams 118 received from the participant nodes 104 and the ingress master digital voice stream 136 of the master node 102 to obtain the mixed digital voice stream 120. Accordingly, the mixed digital voice stream 120 mixes the voice streams of all conference participants. That is, the mixed digital voice stream 120 mixes the participant digital voice streams 118 of the participant nodes 104 and the ingress master digital voice stream 136 of the master node 102.

At 610 the method 600 further includes transmitting the mixed digital voice stream to the plurality of participant nodes over a multicast session. For example, in an aspect, the master node 102 may transmit, e.g., via a transceiver, the mixed digital voice stream 120 to the participant nodes 104 over a multicast session.

At 612 the method 600 may further include cancelling the ingress digital voice stream from the mixed digital voice stream to obtain an echo-cancelled mixed digital voice stream. For example, in an aspect, optionally, the digital echo canceller 124 at the master controller 116 may cancel the ingress master digital voice stream 136 from the mixed digital voice stream 120 to obtain the master echo-cancelled mixed digital voice stream 132.

At 614 the method 600 may further include converting the echo-cancelled mixed digital voice stream into an echo-cancelled mixed analog voice stream. For example, in an aspect, optionally, the DAC 126 at the master controller 116 may convert the master echo-cancelled mixed digital voice stream 132 into the master echo-cancelled mixed analog voice stream 134.

At 616 the method 600 may further include sending the echo-cancelled mixed analog voice stream to the master phone card of the master node. For example, in an aspect, optionally, the master controller 116 may send, e.g., via a transceiver, the master echo-cancelled mixed analog voice stream 134 to the master phone card 114 of the master node 102, so that the master echo-cancelled mixed analog voice stream 134 may be outputted by the handsets 110 connected to the master phone card 114 of the master node 102.

Figure 7:
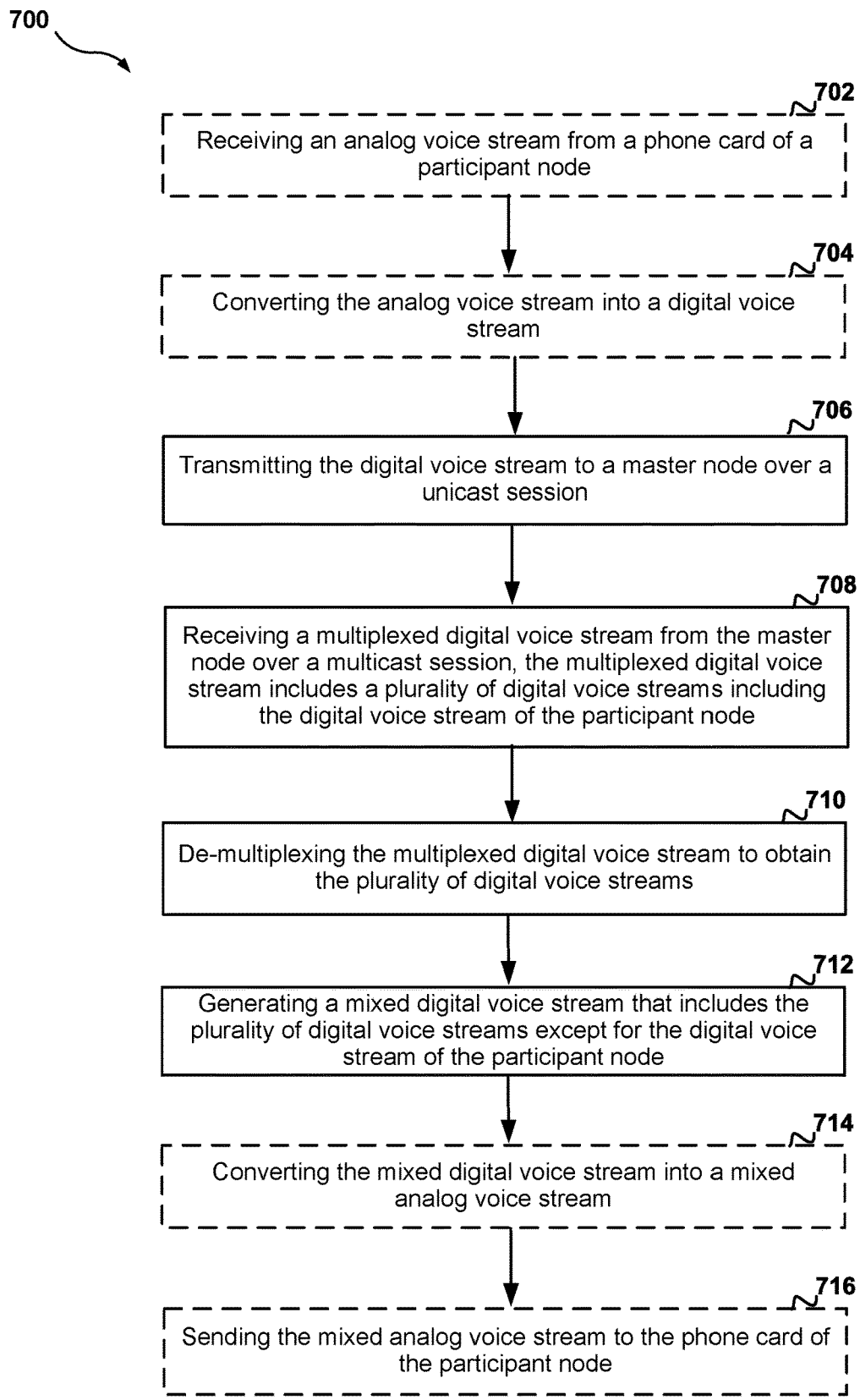
FIG. 7 is a flow diagram of a second example method of VoIP conferencing implemented at a participant node.

Referring now to FIG. 7, at 702 a method of VoIP conferencing at a participant node may include receiving an analog voice stream from a phone card of a participant node 104. For example, in an aspect, optionally, the participant controller 112 at a participant node 104 may receive, e.g., via a transceiver, a participant analog voice stream 131 from the phone card 108 of that participant node 104. Optionally, in an aspect, for example, the phone card 108 may aggregate one or more handsets 110 or one or more subtended phone cards. Optionally, in an aspect, for example, the participant controller 112 may include an analog hybrid filtering circuit 152 that performs analog echo cancellation on the participant analog voice stream 131.

At 704 the method 700 may include converting the analog voice stream into a digital voice stream. For example, in an aspect, optionally, the ADC 128 in the participant controller 112 may convert the participant analog voice stream 131 received from the phone card 108 into a participant digital voice stream 118.

At 706 the method 700 includes transmitting a digital voice stream to a master node over a unicast session. For example, in an aspect, the participant node 104 may transmit, e.g., via a transceiver, the participant digital voice stream 118 to the master node 102 via the network 106 over a unicast session.

At 708 the method 700 includes receiving a multiplexed digital voice stream from the master node over a multicast session, where the multiplexed digital voice stream includes a plurality of digital voice streams including the digital voice stream of the participant node. For example, in an aspect, the participant node 104 may receive, e.g., via a transceiver, the multiplexed digital voice stream 138 from the master node 102 over a multicast session, where the multiplexed digital voice stream 138 multiplexes a plurality of digital voice streams including the participant digital voice stream 118 of the participant node 104. In an aspect, for example, the multiplexed digital voice stream 138 includes the voice streams of all conference participants in the second VoIP conferencing system 200.

At 710 the method 700 further includes de-multiplexing the multiplexed digital voice stream to obtain the plurality of digital voice streams. For example, in an aspect, the de-multiplexer 144 in the participant controller 112 of the participant node 104 de-multiplexes the multiplexed digital voice stream 138 to obtain the individual voice streams of all conference participants, i.e., the master node 102 and the participant nodes 104 in the second VoIP conferencing system 200.

At 712 the method 700 further includes generating a mixed digital voice stream that includes the plurality of digital voice streams except for the digital voice stream of the participant node. For example, in an aspect, the mixer 122 at the participant controller 112 of the participant node 104 generates a participant mixed digital voice stream 143 that includes all the individual voice streams outputted by the de-multiplexer 144 except for the ingress participant digital voice streams 118 of the participant node 104. Accordingly, the participant mixed digital voice stream 143 generated by the mixer 122 at the participant controller 112 of the participant node 104 mixes the voice streams of all conference participants in the second VoIP conferencing system 200 except for the participant node 104.

At 714 the method 700 may include converting the mixed digital voice stream into a mixed analog voice stream. For example, in an aspect, optionally, the DAC 126 in the participant controller 112 of the participant node 104 may convert the participant mixed digital voice stream 143 into the participant mixed analog voice stream 119.

At 716 the method 700 may include sending the mixed analog voice stream to the phone card of the participant node. For example, in an aspect, optionally, the participant controller 112 of the participant node 104 may send, e.g., via a transceiver, the participant mixed analog voice stream 119 to the phone card 108 of the participant node 104, so that the participant mixed analog voice stream 119 may be outputted by the handsets 110 connected to the phone card 108 of the participant node 104.

Figure 8:
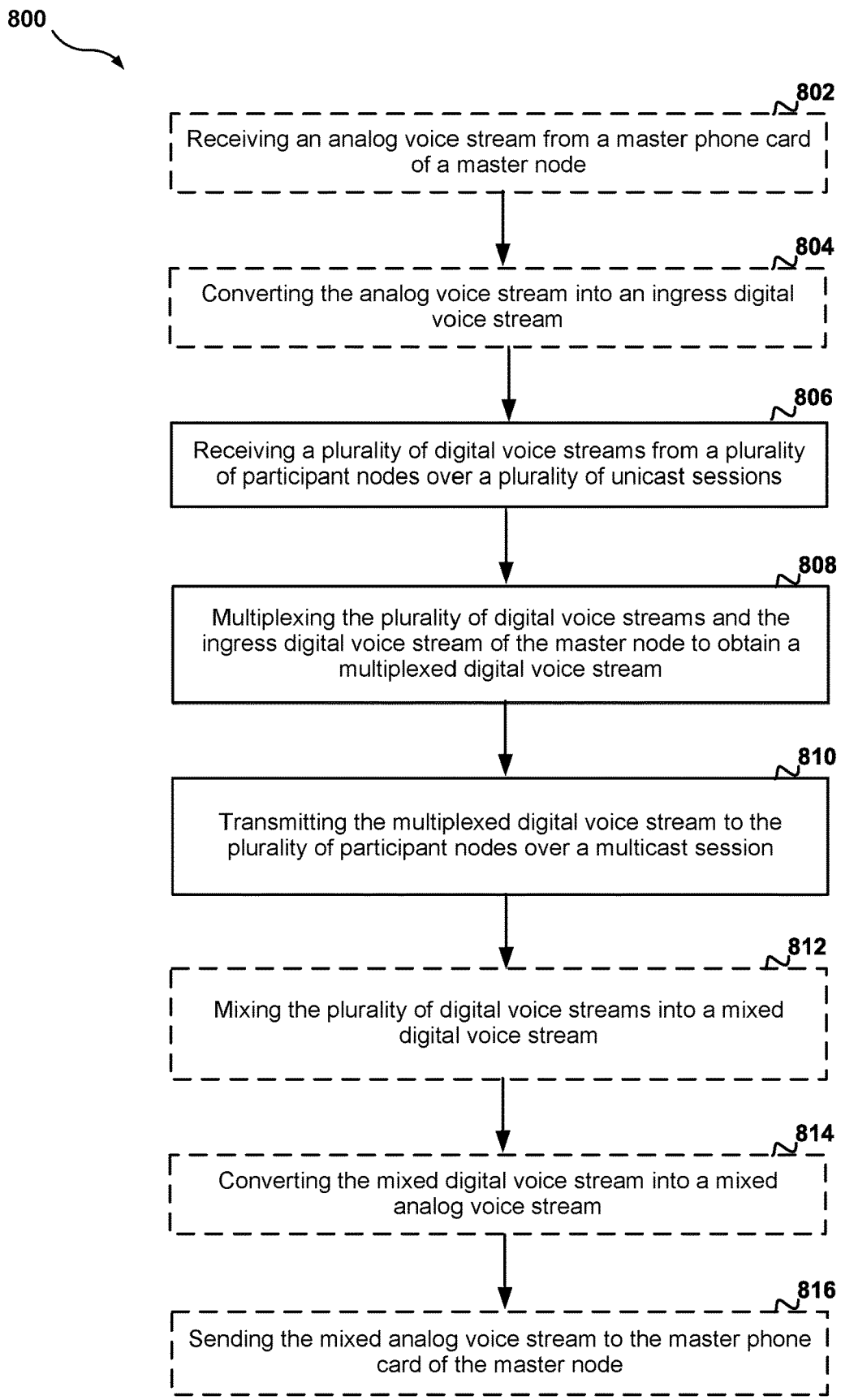
FIG. 8 is a flow diagram of a second example method of VoIP conferencing implemented at a master node.

Referring next to FIG. 8, a method 800 of VoIP conferencing at a master node may include receiving an analog voice stream from a master phone card of a master node. For example, in an aspect, optionally, the master controller 116 at the master node 102 may receive, e.g., via a transceiver, the ingress master analog voice stream 130 from the master phone card 114 of the master node 102. Optionally, in an aspect, for example, the master phone card 114 may aggregate one or more handsets 110 or one or more subtended phone cards. Optionally, in an aspect, for example, the master controller 116 may include an analog hybrid filtering circuit 152 that performs analog echo cancellation on the ingress master analog voice stream 130.

At 804 the method 800 may further include converting the analog voice stream into an ingress digital voice stream. For example, in an aspect, optionally, the ADC 128 at the master controller 116 may convert the ingress master analog voice stream 130 into the ingress master digital voice stream 136.

At 806 the method 800 further includes receiving a plurality of digital voice streams from a plurality of participant nodes over a plurality of unicast sessions. For example, in an aspect, the master node 102 may receive, e.g., via a transceiver, the participant digital voice streams 118 from the participant nodes 104 over respective unicast sessions.

At 808 the method 800 further includes multiplexing the plurality of digital voice streams and an ingress digital voice stream of the master node to obtain a multiplexed digital voice stream. For example, in an aspect, the multiplexer 140 at the master controller 116 may multiplex the participant digital voice streams 118 received from the participant nodes 104 and the ingress master digital voice stream 136 of the master node 102 to obtain the multiplexed digital voice stream 138. Accordingly, in an aspect, for example, the multiplexed digital voice stream 138 includes the voice streams of all conference participants in the second VoIP conferencing system 200. That is, the multiplexed digital voice stream 138 includes the participant digital voice streams 118 of the participant nodes 104 and the ingress master digital voice stream 136 of the master node 102.

At 810 the method 800 further includes transmitting the multiplexed digital voice stream to the plurality of participant nodes over a multicast session. For example, in an aspect, the master node 102 may transmit, e.g., via a transceiver, the multiplexed digital voice stream 138 to the participant nodes 104 over a multicast session.

At 812 the method 800 may further include mixing the plurality of digital voice streams into a mixed digital voice stream. For example, in an aspect, the mixer 122 at the master controller 116 may mix the participant digital voice streams 118 received from the participant nodes 104 into the master mixed digital voice stream 142. Accordingly, in an aspect, for example, the master mixed digital voice stream 142 includes the voice streams of all conference participants in the second VoIP conferencing system 200 except for the master node 102.

At 814 the method 800 may further include converting the mixed digital voice stream into a mixed analog voice stream. For example, in an aspect, optionally, the DAC 126 at the master controller 116 may convert the master mixed digital voice stream 142 into the master mixed analog voice stream 141.

At 816 the method 800 may further include sending the mixed analog voice stream to the master phone card of the master node. For example, in an aspect, optionally, the master controller 116 may send, e.g., via a transceiver, the master mixed analog voice stream 141 to the master phone card 114 of the master node 102, so that the master mixed analog voice stream 141 may be outputted by the handsets 110 connected to the master phone card 114 of the master node 102.

Figure 9:
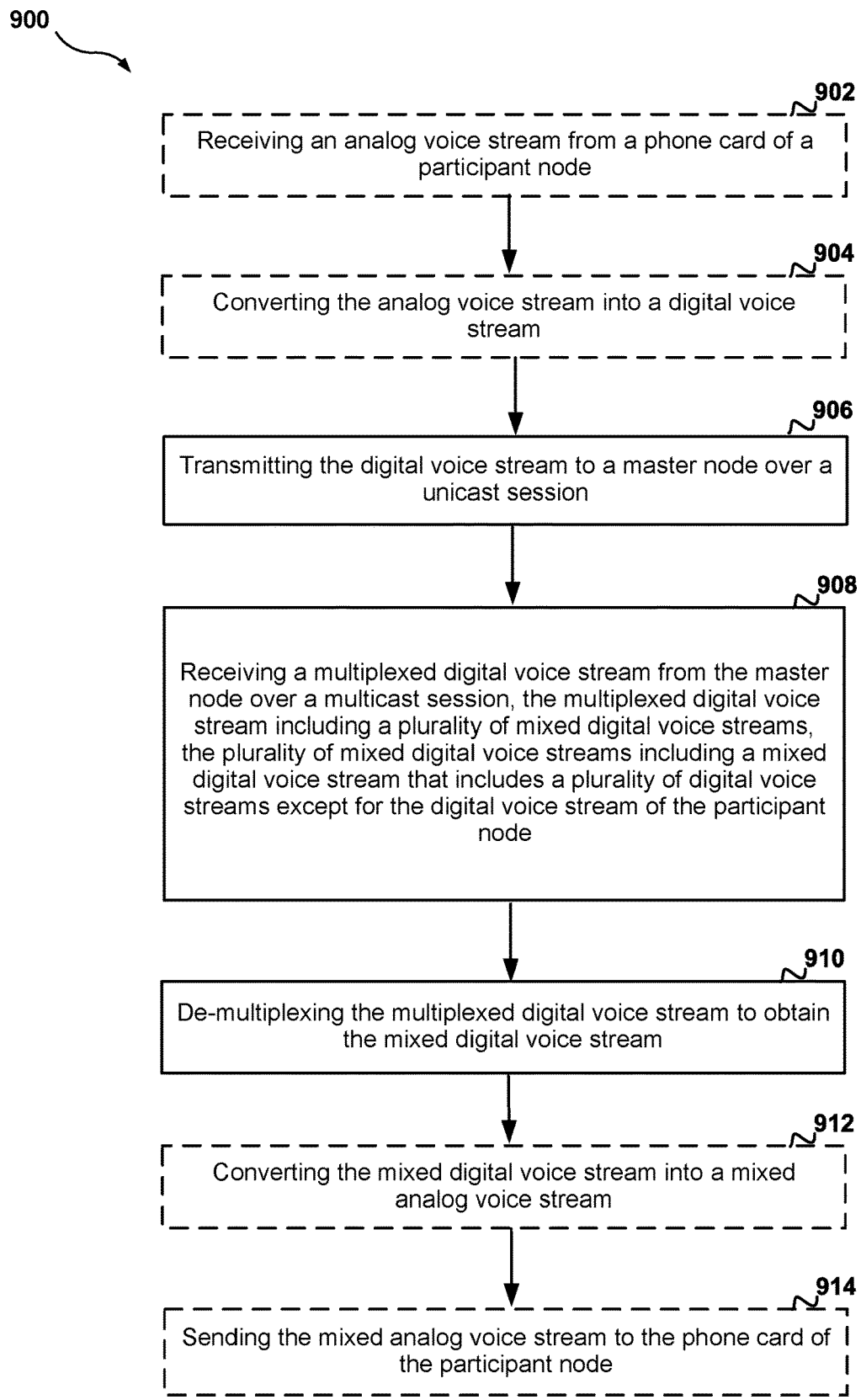
FIG. 9 is a flow diagram of a third example method of VoIP conferencing implemented at a participant node.

Referring now to FIG. 9, a method 900 of VoIP conferencing at a participant node may include receiving an analog voice stream from a phone card of a participant node. For example, in an aspect, optionally, the participant controller 112 at a participant node 104 may receive, e.g., via a transceiver, a participant analog voice stream 131 from the phone card 108 of that participant node 104. Optionally, in an aspect, for example, the phone card 108 may aggregate one or more handsets 110 or one or more subtended phone cards. Optionally, in an aspect, for example, the participant controller 112 may include an analog hybrid filtering circuit 152 that performs analog echo cancellation on the participant analog voice stream 131.

At 904 the method 900 may include converting the analog voice stream into a digital voice stream. For example, in an aspect, optionally, the ADC 128 in the participant controller 112 may convert the participant analog voice stream 131 received from the phone card 108 into the participant digital voice stream 118.

At 906 the method 900 includes transmitting the digital voice stream to a master node over a unicast session. For example, in an aspect, the participant node 104 may transmit, e.g., via a transceiver, the participant digital voice stream 118 to the master node 102 over a unicast session, e.g., via the network 106.

At 908 the method 900 includes receiving a multiplexed digital voice stream from the master node over a multicast session, where the multiplexed digital voice stream includes a plurality of mixed digital voice streams, the plurality of mixed digital voice streams including a mixed digital voice stream that includes a plurality of digital voice streams except for the digital voice stream of the participant node. For example, in an aspect, the participant node 104 may receive, e.g., via a transceiver, the multiplexed mixed digital voice stream 146 from the master node 102 over a multicast session, where the multiplexed mixed digital voice stream 146 includes a plurality of mixed voice streams 150, and the plurality of mixed voice streams 150 includes the participant mixed digital voice stream 143 that includes the digital voice streams of all conference participants except for the ingress participant digital voice stream 118 of the participant node 104.

At 910 the method 900 further includes de-multiplexing the multiplexed mixed digital voice stream to obtain the mixed digital voice streams. For example, in an aspect, the de-multiplexer 144 in the participant controller 112 of the participant node 104 de-multiplexes the multiplexed mixed digital voice stream 146 to obtain the participant mixed digital voice stream 143 configured for the participant nodes 104.

At 914 the method 900 may include converting the mixed digital voice stream into a mixed analog voice stream. For example, in an aspect, optionally, the DAC 126 in the participant controller 112 may convert the participant mixed digital voice stream 143 into the participant mixed analog voice stream 119.

At 916 the method 900 may include sending the mixed analog voice stream to the phone card of the participant node. For example, in an aspect, optionally, the participant controller 112 may send, e.g., via a transceiver, the participant mixed analog voice stream 119 to the phone card 108 of the participant node 104, so that the participant mixed analog voice stream 119 may be outputted by the handsets 110 connected to the phone card 108 of the participant node 104.

Figure 10:
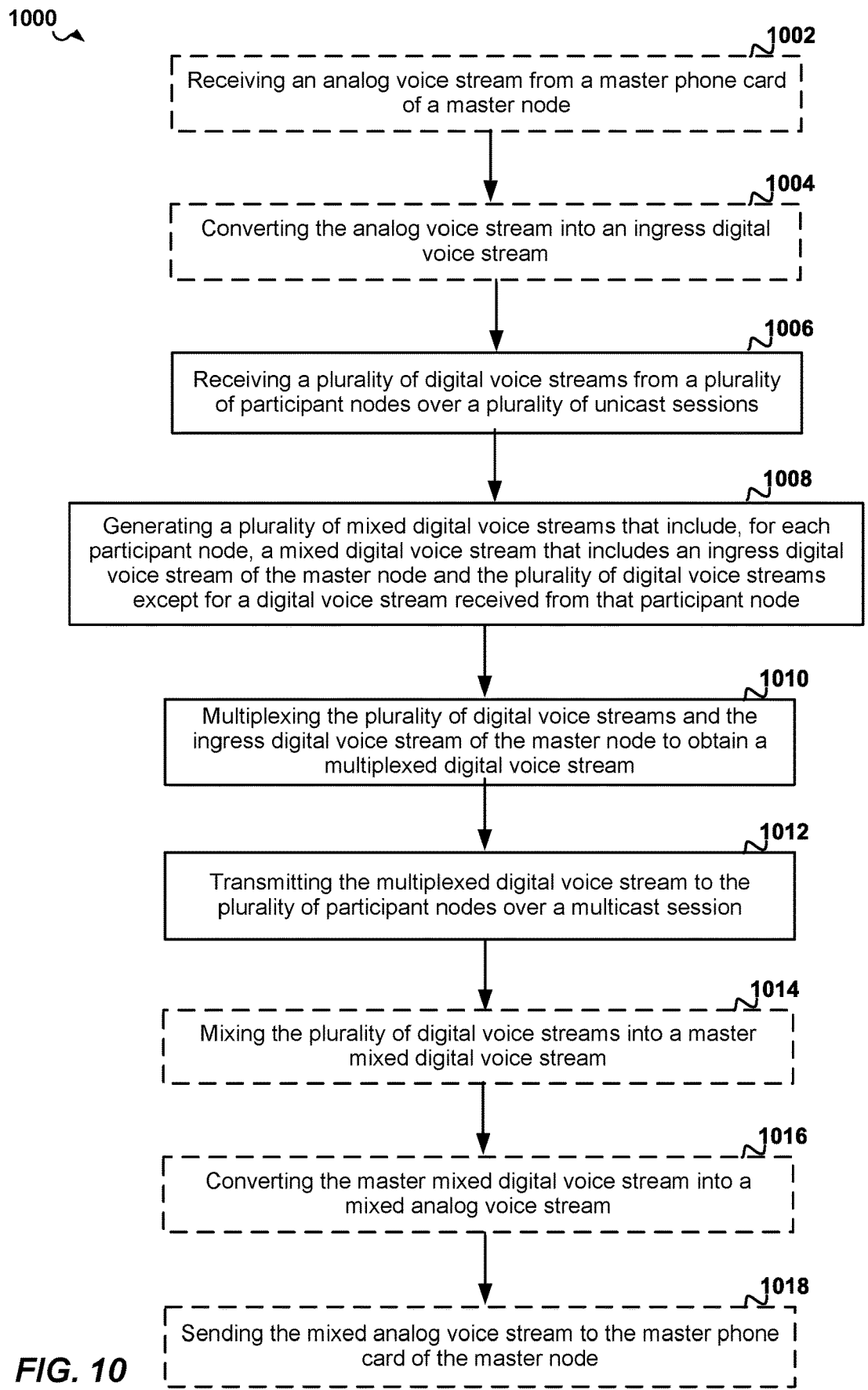
FIG. 10 is a flow diagram of a third example method of VoIP conferencing implemented at a master node.

Referring last to FIG. 10, at 1002 a method 1000 of VoIP conferencing at a master node may include receiving an analog voice stream from a master phone card of a master node. For example, in an aspect, optionally, the master controller 116 at the master node 102 may receive, e.g., via a transceiver, the ingress master analog voice stream 130 from the master phone card 114 of the master node 102. Optionally, in an aspect, for example, the master phone card 114 may aggregate one or more handsets 110 or one or more subtended phone cards. Optionally, in an aspect, for example, the master controller 116 may include an analog hybrid filtering circuit 152 that performs analog echo cancellation on the ingress master analog voice stream 130.

At 1004 the method 1000 may further include converting the analog voice stream into an ingress digital voice stream. For example, in an aspect, optionally, the ADC 128 at the master controller 116 may convert the ingress master analog voice stream 130 into the ingress master digital voice stream 136.

At 1006 the method 1000 further includes receiving a plurality of digital voice streams from a plurality of participant nodes over a plurality of unicast sessions. For example, in an aspect, the master node 102 may receive, e.g., via a transceiver, the participant digital voice streams 118 from the participant nodes 104 over respective unicast sessions.

At 1008 the method 1000 further includes generating a plurality of mixed digital voice streams that include, for each participant node, a mixed digital voice stream that includes an ingress digital voice stream of the master node and the plurality of digital voice streams except for a digital voice stream received from that participant node. For example, in an aspect, the mixer 122 in the master controller 116 may generate a plurality of mixed voice streams 150 that include, for each participant node 104, a participant mixed digital voice stream 143 that includes the ingress master digital voice stream 136 of the master node 102 and a plurality of participant digital voice streams except for the participant digital voice stream 118 received from that participant node 104.

At 1010 the method 1000 further includes multiplexing the plurality of mixed digital voice streams into a multiplexed digital voice stream. For example, in an aspect, the multiplexer 140 at the master controller 116 of the master node 102 may multiplex the plurality of mixed voice streams 150 into the multiplexed mixed digital voice stream 146.

At 1012 the method 1000 further includes transmitting the multiplexed mixed digital voice stream to the plurality of participant nodes over a multicast session. For example, in an aspect, the master node 102 may transmit, e.g., via a transceiver, the multiplexed mixed digital voice stream 146 to the participant nodes 104 over a multicast session.

At 1014 the method 1000 may further include mixing the plurality of digital voice streams into a master mixed digital voice stream. For example, in an aspect, the mixer 122 at the master controller 116 of the master node 102 may mix the participant digital voice streams 118 received from the participant nodes 104 into the master mixed digital voice stream 142. Accordingly, in an aspect, for example, the master mixed digital voice stream 142 includes the voice streams of all conference participants in the third VoIP conferencing system 300 except for the master node 102.

At 1016 the method 1000 may further include converting the master mixed digital voice stream into a mixed analog voice stream. For example, in an aspect, optionally, the DAC 126 at the master controller 116 may convert the master mixed digital voice stream 142 into the master mixed analog voice stream 141.

At 1018 the method 1000 may further include sending the mixed analog voice stream to the master phone card of the master node. For example, in an aspect, optionally, the master controller 116 may send, e.g., via a transceiver, the master mixed analog voice stream 141 to the master phone card 114 of the master node 102, so that the master mixed analog voice stream 141 may be outputted by the handsets 110 connected to the master phone card 114 of the master node 102.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of voice over Internet protocol (VoIP) conferencing at a participant node, comprising:
   transmitting, by the participant node, a digital voice stream to a master node over a unicast session;
   receiving, by the participant node, a mixed digital voice stream from the master node over a multicast session, wherein the mixed digital voice stream includes a plurality of digital voice streams, wherein one of the plurality of digital voice streams is the digital voice stream of the participant node, wherein another one of the plurality of digital voice streams is an ingress digital voice stream of the master node; and
   cancelling, by the participant node, the digital voice stream of the participant node from the mixed digital voice stream to obtain an echo-cancelled mixed digital voice stream.

2. The method of claim 1, wherein the digital voice stream is generated by:
   receiving, by the participant node, an analog voice stream from a phone card of the participant node; and
   converting, by the participant node, the analog voice stream into the digital voice stream.

3. The method of claim 2, wherein the phone card aggregates one or more handsets or one or more subtended phone cards.

4. The method of claim 2, further comprising:
   performing, by the participant node, analog echo cancellation on the analog voice stream received from the phone card.

5. The method of claim 2, further comprising:
   converting, by the participant node, the echo-cancelled mixed digital voice stream into an echo-cancelled mixed analog voice stream; and
   sending, by the participant node, the echo-cancelled mixed analog voice stream to the phone card of the participant node.

6. A method of voice over Internet protocol (VoIP) conferencing at a master node, comprising:
   receiving, by the master node, a plurality of digital voice streams from a plurality of participant nodes over a plurality of unicast sessions;
   mixing, by the master node, the plurality of digital voice streams and an ingress digital voice stream of the master node to obtain a mixed digital voice stream; and
   transmitting, by the master node, the mixed digital voice stream to the plurality of participant nodes over a multicast session.

7. The method of claim 6, wherein the ingress digital voice stream is generated by:
   receiving, by the master node, an analog voice stream from a master phone card of the master node; and
   converting, by the master node, the analog voice stream into the ingress digital voice stream.

8. The method of claim 7, wherein the master phone card aggregates one or more handsets or one or more subtended phone cards.

9. The method of claim 7, further comprising:
   performing, by the master node, analog echo cancellation on the analog voice stream received from the master phone card.

10. The method of claim 7, further comprising:
    cancelling, by the master node, the ingress digital voice stream from the mixed digital voice stream to obtain an echo-cancelled mixed digital voice stream;
    converting, by the master node, the echo-cancelled mixed digital voice stream into an echo-cancelled mixed analog voice stream; and
    sending, by the master node, the echo-cancelled mixed analog voice stream to the master phone card of the master node.

11. A participant node for voice over Internet protocol (VoIP) conferencing, comprising:
    a transceiver configured to:
      transmit a digital voice stream to a master node over a unicast session; and
      receive a mixed digital voice stream from the master node over a multicast session, wherein the mixed digital voice stream includes a plurality of digital voice streams, wherein one of the plurality of digital voice streams is the digital voice stream of the participant node, wherein another one of the plurality of digital voice streams is an ingress digital voice stream of the master node; and
    a digital echo canceller configured to cancel the digital voice stream of the participant node from the mixed digital voice stream to obtain an echo-cancelled mixed digital voice stream.

12. The participant node of claim 11, further comprising:
    a phone card; and
    an analog to digital converter (ADC) configured to generate the digital voice stream by:
      receiving an analog voice stream from the phone card of the participant node; and
      converting the analog voice stream into the digital voice stream.

13. The participant node of claim 12, wherein the phone card aggregates one or more handsets or one or more subtended phone cards.

14. The participant node of claim 12, further comprising:
    an analog hybrid filtering circuit configured to perform analog echo cancellation on the analog voice stream received from the phone card.

15. The participant node of claim 12, further comprising:
    a digital to analog converter (DAC) configured to convert the echo-cancelled mixed digital voice stream into an echo-cancelled mixed analog voice stream, wherein the echo-cancelled mixed analog voice stream is input to the phone card.

16. A master node for voice over Internet protocol (VoIP) conferencing, comprising:
    a transceiver configured to receive a plurality of digital voice streams from a plurality of participant nodes over a plurality of unicast sessions;
    a mixer configured to mix the plurality of digital voice streams and an ingress digital voice stream of the master node to obtain a mixed digital voice stream; and
    wherein the transceiver is further configured to transmit the mixed digital voice stream to the plurality of participant nodes over a multicast session.

17. The master node of claim 16, further comprising:
    a master phone card; and
    an analog to digital converter (ADC) configured to generate the ingress digital voice stream by:
      receiving an analog voice stream from the master phone card; and
      converting the analog voice stream into the ingress digital voice stream.

18. The master node of claim 17, wherein the master phone card aggregates one or more handsets or one or more subtended phone cards.

19. The master node of claim 17, further comprising:
an analog hybrid filtering circuit configured to perform analog echo cancellation on the analog voice stream received from the master phone card.

20. The master node of claim 17, further comprising:
a digital echo canceller configured to cancel the ingress digital voice stream from the mixed digital voice stream to obtain an echo-cancelled mixed digital voice stream; and
a digital to analog converter (DAC) configured to convert the echo-cancelled mixed digital voice stream into an echo-cancelled mixed analog voice stream, wherein the echo-cancelled mixed analog voice stream is input to the master phone card.

* * * * *